US009552216B2

United States Patent
Zheng et al.

(10) Patent No.: US 9,552,216 B2
(45) Date of Patent: Jan. 24, 2017

(54) PASS-THROUGH NETWORK INTERFACE CONTROLLER CONFIGURED TO SUPPORT LATENCY SENSITIVE VIRTUAL MACHINES

(71) Applicant: VMware, Inc., Palo Alto, CA (US)

(72) Inventors: Haoqiang Zheng, Mountain View, CA (US); Lenin Singaravelu, Sunnyvale, CA (US); Shilpi Agarwal, San Mateo, CA (US); Daniel Michael Hecht, San Francisco, CA (US); Garrett Smith, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 156 days.

(21) Appl. No.: 14/468,138

(22) Filed: Aug. 25, 2014

(65) Prior Publication Data

US 2015/0058847 A1 Feb. 26, 2015

Related U.S. Application Data (60) Provisional application No. 61/870,143, filed on Aug. 26, 2013.

(51) Int. Cl.
*G06F 9/455* (2006.01)
*H04L 12/875* (2013.01)
*H04L 12/26* (2006.01)
*H04L 12/927* (2013.01)
(Continued)

(52) U.S. Cl.
CPC ....... *G06F 9/45558* (2013.01); *G06F 9/45533* (2013.01); *G06F 9/5027* (2013.01); *G06F 9/5033* (2013.01); *G06F 9/5088* (2013.01); *G06F 13/24* (2013.01); *H04L 43/0894* (2013.01); *H04L 43/16* (2013.01); *H04L 47/56* (2013.01); *H04L 47/801* (2013.01); *G06F 9/50* (2013.01); *G06F 2009/45575* (2013.01); *G06F 2009/45591* (2013.01); *G06F 2209/5017* (2013.01)

(58) Field of Classification Search
None
See application file for complete search history.

(56) References Cited

U.S. PATENT DOCUMENTS

| 7,236,459 B1 | 6/2007 | Okholm et al. |
| 7,765,543 B1 | 7/2010 | Weissman et al. |
| 8,005,022 B2 | 8/2011 | Tripathi et al. |

(Continued)

OTHER PUBLICATIONS

"Best Practices for Performance Tuning of Latency-Sensitive Workloads in vSphere Virtual Machines," VMware Technical White Paper, May 15, 2013, pp. 1-9, available at: http://web.archive.org/web/20130515013812/http://www.vmware.com/files/pdf/techpaper/VMW-Tuning-Latency-Sensitive-Workloads.pdf.

(Continued)

*Primary Examiner* — Gregory A Kessler (57) ABSTRACT

A host computer has a plurality of virtual machines executing therein under the control of a hypervisor, where the host also includes a physical network interface controller (NIC). An interrupt controller detects an interrupt generated by the physical NIC, where the interrupt corresponds to a virtual machine. If the virtual machine has exclusive affinity to one or more physical central processing units (CPUs), then the interrupt is forwarded to the virtual machine. If the virtual machine does not have exclusive affinity, then a process in the hypervisor is invoked to forward the interrupt to the virtual machine.

20 Claims, 4 Drawing Sheets

(51) Int. Cl.
*G06F 13/24* (2006.01)
*G06F 9/50* (2006.01)

(56) References Cited

U.S. PATENT DOCUMENTS

| | | | |
|---|---|---|---|
| 8,166,485 | B2 | 4/2012 | Krishnakumar et al. |
| 8,364,997 | B2 | 1/2013 | Tian et al. |
| 8,943,252 | B2 | 1/2015 | Waters et al. |
| 2007/0150898 | A1 | 6/2007 | Duda et al. |
| 2010/0106874 | A1 | 4/2010 | Dominguez et al. |
| 2010/0125843 | A1 | 5/2010 | Saito et al. |
| 2010/0229173 | A1 | 9/2010 | Subrahmanyam et al. |
| 2010/0274940 | A1 | 10/2010 | Ahmad et al. |
| 2011/0197003 | A1 | 8/2011 | Serebrin et al. |
| 2011/0247001 | A1 | 10/2011 | Smith et al. |
| 2012/0254862 | A1* | 10/2012 | Dong ............ G06F 9/4856 718/1 |
| 2014/0215463 | A1 | 7/2014 | Hendel et al. |

OTHER PUBLICATIONS

"What's New in VMware vSphere 5.1—Performance" VMware Technical Marketing Documentation, V 1.0 / Oct. 2012, Aug. 9, 2013, pp. 1-17, available at: http://web.archive.org/web/20130809042604/http://www.vmware.com/files/pdf/techpaper/Whats-New-VMware-vSphere-51-Performance-Technical-Whitepaper.pdf.

"Network I/O Latency on VMware vSphere 5—Performance Study" VMware Technical White Paper, May 31, 2013, pp. 1-15, available at: http://web.archive.org/web/20130531071037/http://www.vmware.com/files/pdf/techpaper/network-io-latency-perf-vsphere5.pdf.

Alizadeh et al, "Less is More: Trading a little Bandwidth for Ultra-Low Latency in the Data Center" USENIX Apr. 11, 2013, pp. 1-14.

Singaravelu, "Performance and Use Cases of VMware DirectPath I/O for Networking" VMware VROOM! Blog Dec. 6, 2010, pp. 1-8, available at: http://blogs.vmware.com/performance/2010/12/performance-and-use-cases-of-vmware-directpath-io-for-networking.html.

Li et al, "Affinity-Aware Dynamic Pinning Scheduling for Virtual Machines" 2nd IEEE International Conference on Cloud Computing Technology and Science, Nov. 30, 2010, pp. 242-249.

International Search Report mailed Dec. 3, 2014 in counterpart PCT Application PCT/US2014/052555.

International Search Report mailed Dec. 11, 2014 in counterpart PCT Application PCT/US2014/052557.

International Search Report mailed Nov. 6, 2014 in counterpart PCT Application PCT/US2014/052560.

International Search Report mailed Nov. 10, 2014 in counterpart PCT Application PCT/US2014/052564.

"Deploying Extremely Latency-Sensitive Applications in Vmware vSphere 5.5"; Vmware Technical Whitepaper (vmware.com); Aug. 27, 2013.

"Vmware, Coreinfo and mapping logical CPU cores to physical processors"; Shogan.tech (www.shogan.co.uk) How-to website; Jun. 28, 2011.

Sean K. Barker et al., "Empirical Evaluation of Latency-sensitive Application Performance in the Cloud", Feb. 23, 2010, MMSys'10, pp. 1-2.

Adit Ranadive et al., "ResourceExchange: Latency-Aware Scheduling in Virtualized Environments with High Performance Fabrics", 2011, IEEE, pp. 45-53.

Cong Xu et al., "vSlicer: Latency-Aware Virtual Machine Scheduling via Differentiated-Frequency CPU Slicing", 2012, Purdue University Purdue e-Pubs, pp. 1-14.

U.S. Appl. No. 14/468,181 dated Apr. 19, 2016 consists of 15 pages.

* cited by examiner

FIG. 1

| Latency Sensitivity Table 155 | | |
|---|---|---|
| VM ID $210_1$ | Latency Sensitivity Indicator = N | Exclusive Affinity = N |
| VM ID $210_2$ | Latency Sensitivity Indicator = Y | Exclusive Affinity = Y |

PASS-THROUGH NETWORK INTERFACE CONTROLLER CONFIGURED TO SUPPORT LATENCY SENSITIVE VIRTUAL MACHINES

CROSS REFERENCE TO OTHER APPLICATIONS

This application claims priority to U.S. Provisional Patent Application No. 61/870,143, entitled "TECHNIQUES TO SUPPORT HIGHLY LATENCY SENSITIVE VMs," filed Aug. 26, 2013, the contents of which is incorporated herein by reference. This application is related to: U.S. patent application Ser. No. 14/468,121, entitled "CPU Scheduler Configured to Support Latency Sensitive Virtual Machines", filed Aug. 25, 2014; U.S. patent application Ser. No. 14/468,122, entitled "Virtual Machine Monitor Configured to Support Latency Sensitive Virtual Machines", filed Aug. 25, 2014; and U.S. patent application Ser. No.14/468,181, entitled "Networking Stack of Virtualization Software Configured to Support Latency Sensitive Virtual Machines", filed Aug. 25, 2014, the entire contents of which are incorporated herein by reference.

BACKGROUND

Applications characterized as "latency sensitive" are, typically, highly susceptible to execution delays and jitter (i.e., unpredictability) introduced by the computing environment in which these applications run. Examples of latency sensitive applications include financial trading systems, which usually require response time on the order of microseconds when performing functions such as pricing securities or executing and settling trades.

Execution delay and jitter are often present in networked virtualized computing environments. Such computing environments frequently include a number of virtual machines (VMs) that execute one or more applications that rely on network communications. These virtualized applications communicate over the network by transmitting data packets to other nodes on the network using a virtual network interface controller (or VNIC) of the VM, which is a software emulation of a physical network interface controller (or PNIC). The use of a VNIC for network communication adds to the layers of networking software required for processing data packets. For example, the VM transmits packets to a VNIC. The VNIC, in turn, transmits packets to a virtual switch, which is a software emulation of a physical network switch. Finally, the virtual switch transmits data packets to a PNIC of the host computer for further transmission over the network. As a result, employing a VNIC for network communication often results in latency and jitter.

In order to address the latency issues that are present with the use of VNICs, virtual switches, and PNICs, a number of virtualized computing environments use passthrough NICs. A passthrough NIC is a physical NIC that is part of the hardware platform of a computer host, and that is directly accessible to vitualized networking software that executes in a virtual machine. That is, the virtualized networking software transmits and receives data packets to and from the passthrough NIC without using a VNIC and virtual switch. This tends to eliminate some of the latency present in virtualized networking environments.

However, some latency may still be present when passthrough NICs are used instead of VNICs and virtual switches. For example, when a virtual machine transmits and receives packets over a passthrough NIC, the passthrough NIC needs to inform the virtual machine that it is ready to transmit packets, or that it has packets that are ready to be delivered to the virtual machine. This is typically accomplished by an interrupt mechanism. That is, for passthrough NICs that operate in an interrupt mode (as opposed to a polling mode), the pasthrough NIC generates an interrupt to communicate events to the host computer that it is connected to. As such, when the passthrough NIC generates an interrupt, an interrupt controller of the host computer that the passthrough NIC is connected to receives the interrupt and calls an interrupt handler for the passthrough NIC. The memory address of the interrupt handler is located using an interrupt vector.

When an interrupt needs to be posted to a virtual machine, the kernel typically schedules and dispatches one or more tasks to forward the interrupt. In a multiprocessor system, these tasks may be scheduled (i.e., queued for execution) to any of the processors on the host computer in accordance with a scheduling algorithm followed by the kernel. Once the tasks are scheduler and dispatched, the interrupt is posted to virtualized interrupt handling software in the virtual machine. However, the scheduling and other kernel processing for the interrupt posting tasks are an additional source of latency. That is, due to this "extra" kernel processing, there is delay and unpredictability associated with communicating interrupts for the passthrough NIC to the virtual machine.

SUMMARY

A method of processing interrupts from a physical NIC is provided, where the physical NIC is included in a host computer having a plurality of virtual machines executing therein under the control of a hypervisor. The method comprises the steps of detecting an interrupt generated by the physical NIC and determining a virtual machine to which the interrupt corresponds. If the virtual machine has exclusive affinity to a physical central processing unit, then the interrupt is forwarded the virtual machine. If the container does not have exclusive affinity, then a process in the hypervisor to forward the interrupt to the virtual machine is invoked.

Further embodiments provide a non-transitory computer-readable medium that includes instructions that, when executed, enable a host computer to implement one or more aspects of the above method, as well as a virtualized computing system that includes a host computer, a physical NIC, and an interrupt controller that is configured to implement one or more aspects of the above method.

DETAILED DESCRIPTION

Figure 1:
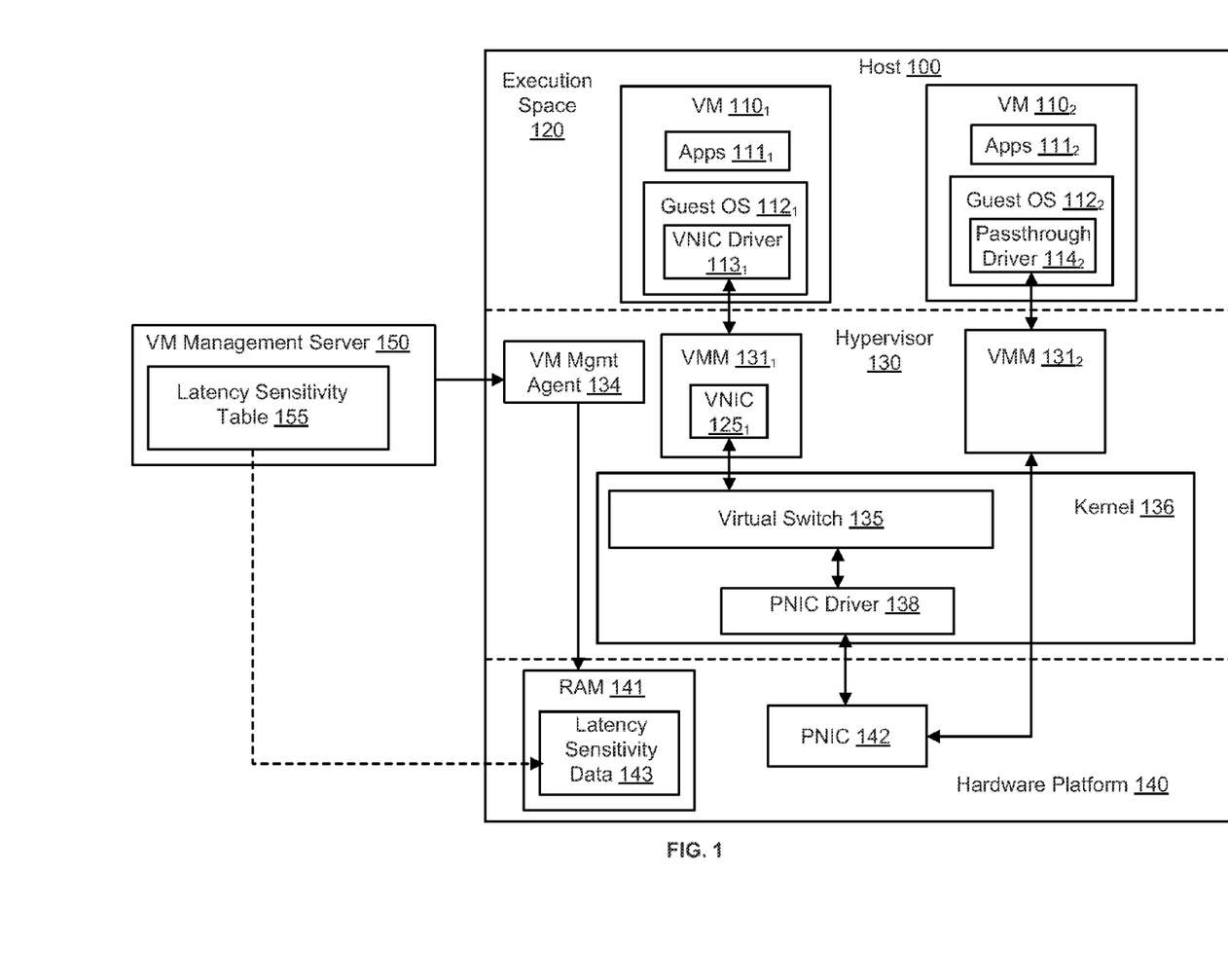
FIG. 1 is a diagram depicting a virtualized computing environment in which one or more embodiments may be implemented.

FIG. 1 depicts a virtualized computing environment in which one or more embodiments may be implemented. As shown, the computing environment includes a host computer 100 and a virtual machine (VM) management server 150. VM management server 150 communicates with host computer 100 over a local connection or, alternatively, over a remote network connection.

Host computer 100 is, in embodiments, a general-purpose computer that supports the execution of an operating system and one more application programs therein. In order to execute the various components that comprise a virtualized computing platform, host computer 100 is typically a server class computer. However, host computer 100 may also be a desktop or laptop computer.

As shown in FIG. 1, host computer 100 is logically divided into three components. First, execution space 120 supports the execution of user-level (i.e., non-kernel level) programs. User-level programs are non-privileged, meaning that they cannot perform certain privileged functions, such as executing privileged instructions or accessing certain protected regions of system memory. Among the programs that execution space 120 supports are virtual machines.

Virtual machines are software implementations of physical computing devices and execute programs much like a physical computer. In embodiments, a virtual machine implements, in software, a computing platform that supports the execution of software applications under the control of a guest operating system (OS). As such, virtual machines typically emulate a particular computing architecture. In FIG. 1, execution space 120 includes VMs $110_1$ and $110_2$. Although, in the embodiment shown in FIG. 1, host computer 100 is depicted as having two virtual machines executing therein, host computer 100 may include any number of virtual machines. Each depicted VM 110 supports the execution of one or more applications 111, each of which executes under the control of a particular guest OS 112. Applications 111 are user-level (non-kernel) programs, such as, for example, word processors or spreadsheet programs. Each of the depicted guest OS' 112 may be one of the well-known commodity operating systems, such as any of the versions of the Windows® operating system from Microsoft Corp., the Linux® operating system, or MacOS® X from Apple, Inc. It should be noted that the applications and guest OS' may vary from one VM to another. Thus, applications $111_1$ in VM $110_1$ may include Microsoft's Word® and Excel® applications running under the control of Windows® 7 as guest OS $112_1$. By contrast, applications $111_2$ in VM $110_2$ may include the Safari® web browser running under the control of MacOS® X as guest OS $112_2$. Further, each of guest OS $112_1$ and OS $112_2$ includes one or more virtual device drivers, each of which drives a particular virtual device on a corresponding virtual hardware platform. Thus, guest OS $112_1$ includes VNIC driver $113_1$ (which drives a VNIC) and guest OS $112_2$ includes passthrough driver $114_2$ (which drives a passthrough NIC). Further, as shown in FIG. 1, each of VMs $110_1$ and $110_2$ communicates with a hypervisor component, referred to herein as hypervisor 130.

Hypervisor 130, as depicted in FIG. 1, provides the operating system platform for running processes on computer host 100. Hypervisor 130 controls all hardware devices within computer host 100 and manages system resources for all applications running therein. Among the core functions that hypervisor 130 provides are console services, file system services, device drivers, resource scheduling, and network data transmission. Further, hypervisor 130 implements software components that provide for the instantiation of one or more virtual machines on the host computer.

As depicted in the embodiment of FIG. 1, hypervisor 130 includes virtual machine monitors (VMMs) $131_1$ and $131_2$. Each VMM 131 corresponds to an executing VM 110. Thus, VMM $131_1$ corresponds to VM $110_1$ and VMM $131_2$ corresponds to VM $110_2$. Each VMM 131 is a software layer that provides a virtual hardware platform to the guest OS for the corresponding virtual machine. It is through a particular VMM 131 that a corresponding VM accesses services provided by the kernel component of hypervisor 130 (shown in FIG. 1 as kernel 136). Among the functions carried out by kernel 136 are memory management, providing networking and storage stacks, and process scheduling.

Each VMM 131 in FIG. 1 implements a virtual hardware platform for the corresponding VM 110. For example, each implemented hardware platform includes one or more virtual central processing units (CPUs) (not shown). Further, the virtual hardware platforms may include one or more VNICs 125. As shown, VMM $131_1$ implements VNIC $125_1$. VNIC $125_1$ appears to be a physical network adapter (i.e., a physical network interface controller, or PNIC) from the standpoint of the applications $111_1$, guest OS $112_1$, and VNIC driver $113_1$, which run in VM $110_1$. In this way, guest OS $112_1$ may transmit and receive data packets in the same way that an operating system that runs directly on a computer host (i.e., in a non-virtualized manner) transmits and receives data packets using PNICs. However, from the standpoint of hypervisor 130 (which, in typical embodiments, executes directly on computer host 100), VNIC $125_1$ is a source application from which it receives data packets that are to be transmitted over a network via one or more PNICs of computer host 100, or a destination application for data packets that are received over the network via a PNIC of computer host 100. Alternatively, hypervisor 130 may transmit data packets between virtual machines that execute on computer host 100 without transmitting those data packets over the network (i.e., via any of the PNICs of computer host 100).

In one or more embodiments, kernel 136 serves as a liaison between VMs 110 and the physical hardware of computer host 100. Kernel 136 is a central operating system component, and executes directly on host 100. In embodiments, kernel 136 allocates memory, schedules access to physical CPUs, and manages access to physical hardware devices connected to computer host 100.

As shown in FIG. 1, kernel 136 implements a virtual switch 135. Virtual switch 135 enables virtual machines executing on computer host 100 to communicate with each other using the same protocols as physical switches. Virtual switch 135 emulates a physical network switch by allowing virtual machines to connect to one or more ports (via the corresponding VNIC of the virtual machines), accepting frames of data (i.e., typically Ethernet frames) from the VNICs, and forwarding the frames to other VNICs connected to other ports of the virtual switch, or, alternatively, to a PNIC of computer host 100. Thus, virtual switch 135 is a software emulation of a physical switch operating at the data-link layer.

As shown in FIG. 1, VNIC $125_1$ (which corresponds to VMMs $131_1$) connects to virtual switch 135. Further, virtual switch 135 connects to PNIC driver 138. According to embodiments, PNIC driver 138 is a device driver for a physical network adapter connected to computer host 100. PNIC driver 138 receives data from virtual switch 138 and transmits the received data over the network via a PNIC for which PNIC driver 138 serves as device driver. PNIC driver 138 also handles incoming data from the PNIC and, among other things, forwards the received data to virtual machines via virtual switch 135.

FIG. 1 also depicts hardware platform 140, which is another component of computer host 100. Hardware platform 140 includes all physical devices, channels, and adapters of computer host 100. Hardware platform 140 includes network adapters (i.e., PNICs), for network communication, as well as host bus adapters (HBAs) (not shown), which enable communication to external storage devices. In addition, hardware platform 140 includes the physical central processing units (CPUs) of computer host 100.

Hardware platform 140 also includes a random access memory (RAM) 141, which, among other things, stores programs currently in execution, as well as data required for such programs. Moreover, RAM 141 stores the various data structures needed to support network data communication. For instance, the various data components that comprise virtual switch 135 (i.e., virtual ports, routing tables, and the like) are stored in RAM 141.

Further, as shown in FIG. 1, hardware platform also includes PNIC 142. PNIC 142 is a computer hardware component that enables computer host 100 to connect to a computer network. PNIC 142 implements the electronic circuitry required to communicate using a specific physical layer and data link layer standard, such as Ethernet, Wi-Fi, or Token Ring. PNIC 142 (which is driven by PNC driver 138) may use one or more techniques to indicate the availability of packets to transfer. For example, PNIC 142 may operate in a polling mode, where a CPU executes a program to examine the status of the PNIC. On the other hand, when PNIC 142 operates in an interrupt-driven mode, the PNIC alerts the CPU (via a generated interrupt) that it is ready to transfer data.

As shown in FIG. 1, passthrough driver $114_2$ (which executes as part of guest OS $112_2$ in VM $110_2$) connects with PNIC 142 via VMM $131_2$, without any intervening connection through a virtual switch or a physical PNIC driver (such as PNIC driver 138). Thus, in the embodiment depicted, PNIC 142 is configured to operate in a passthrough mode. That is, PNIC 142 may be configured to support connectivity to a host PNIC device driver (such as PNIC driver 138), as well as a virtualized device driver (such as passthrough driver $114_2$). As shown, data packets that are transmitted to and from VM $110_1$ are routed through kernel 136 (i.e., virtual switch 135), while data packets that are transmitted to and from VM $110_2$ are not routed through kernel 136. Rather, these packets are transmitted via a connection between passthrough driver $114_2$ and PNIC 142 via VMM $131_2$.

In order to support the networking changes required for executing latency sensitive virtual machines, the embodiment depicted in FIG. 1 includes a VM management server 150. VM management server 150 is, in embodiments, a server application executing either within computer host 100, or (as shown in FIG. 1) remotely from computer host 100. Embodiments of VM management server 150 provide an interface (such as a graphical user interface (or GUI)) through which a system administrator may define, configure, and deploy virtual machines for execution on one or more host computers.

In addition, VM management server 150 provides for the configuration of virtual machines as highly latency sensitive virtual machines. According to one or more embodiments, VM management server 150 maintains a latency sensitivity table 155, which defines latency sensitivity characteristics of virtual machines. Latency sensitivity table 155 is described in further detail below.

As shown in FIG. 1, VM management server 150 communicates with computer host 100, either through a direct local connection or over a computer network. In order to facilitate such communication, VM management agent 134 executes on computer host 100. Although VM management agent 134 is not part of kernel 136, embodiments of the agent run at the hypervisor level within hypervisor 130. However, in other embodiments, VM management agent 134 may run as a user program within execution space 120.

VM management agent 134 receives instructions from VM management server 150 and carries out tasks on behalf of VM management server 150. Among the tasks performed by VM management agent 134 are the configuration and instantiation of virtual machines. One aspect of the configuration of a virtual machine is whether that virtual machine is highly latency sensitive. Thus, VM management agent 134 receives a copy of latency sensitivity table 155 and saves the underlying data within RAM 141 as latency sensitivity data 143. As shown in FIG. 1, once latency sensitivity data 141 is saved to RAM, software modules associated with the processing of interrupts from PNIC 142 access this information in order to determine which virtual machines are highly latency sensitive. Upon determining that one or more virtual machines are highly latency sensitive, the software modules (residing, in embodiments, in the kernel) regulate the communication of interrupts from PNIC 142 based on whether a virtual machine that communicates with PNIC 142 is latency sensitive.

Figure 2:
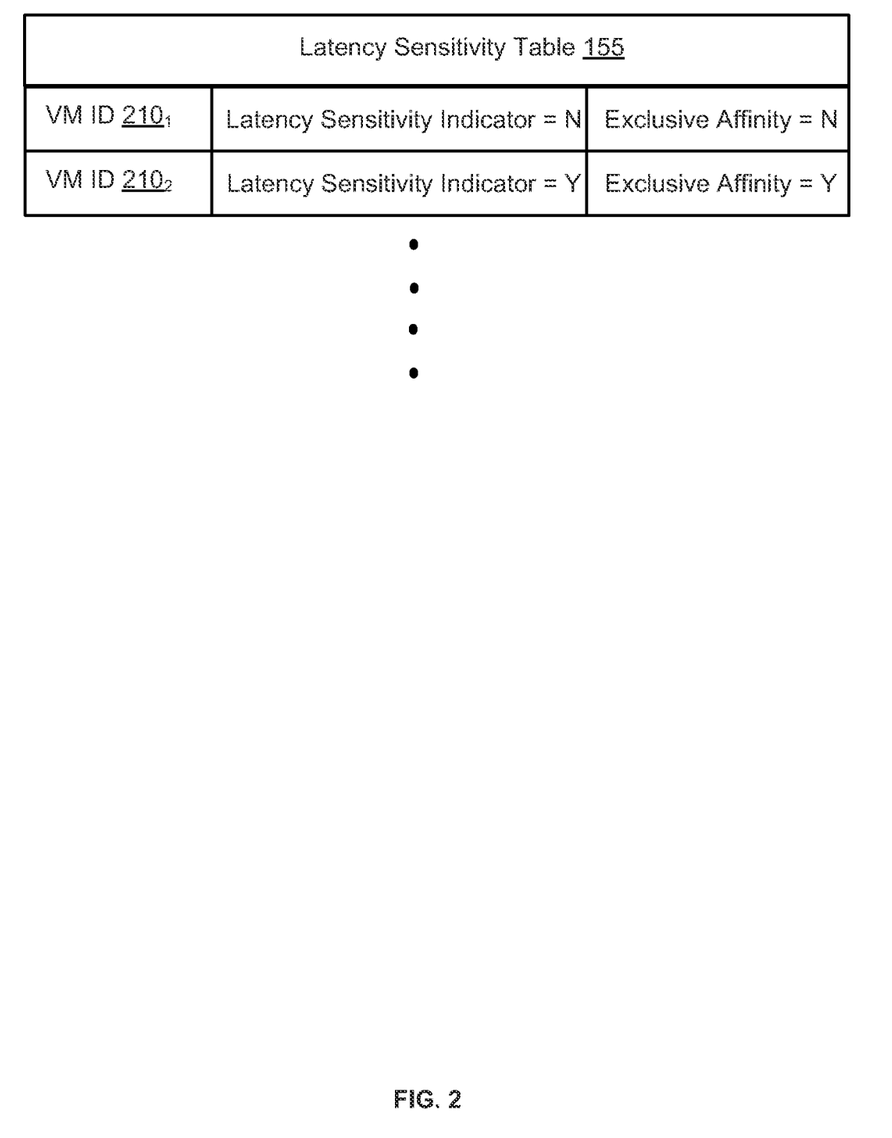
FIG. 2 is a block diagram that depicts a table for storing latency sensitivity information, according to embodiments.

FIG. 2 is a block diagram that depicts one embodiment of latency sensitivity table 155. As shown in the figure, latency sensitivity table 155 stores multiple rows of data, where each row corresponds to a particular virtual machine within host 100. Each virtual machine is identified on the host by a unique VM ID 210. A VM ID 210 may be any unique binary or alphanumeric value that is associated with a virtual machine. As shown in FIG. 2, latency sensitivity table 155 has a plurality of entries, each of which corresponds to a virtual machine VM 110 depicted in FIG. 1.

As shown in FIG. 2, for each VM ID 210, latency sensitivity table 155 stores a latency sensitivity indicator. This indicator may take on two distinct values (such as Y or N), which indicates whether the corresponding virtual machine is highly latency sensitive. In other embodiments, the latency sensitive indicator may take on more than two values (e.g., High, Medium, Low, or Normal), to provide for specifying different degrees of latency sensitivity for the corresponding virtual machine. In FIG. 2, VM ID $210_1$ (corresponding to VM $110_1$) identifies a virtual machine that is not highly latency sensitive because its latency sensitivity indicator is set to N. On the other hand, VM ID $210_2$ (which corresponds to VM $110_2$) identifies a virtual machine that is highly latency sensitive because its corresponding latency sensitivity indicator is set to Y. For example, VM $110_1$ might be a virtual machine that runs a batch processing application (such as a monthly billing system), which typically does not require split-second response time and is generally unaffected by the jitter that may occur in a virtualized computing environment. On the other hand, VM $110_2$ may be a real-time financial trading application, which is a representative latency sensitive application.

Latency sensitivity table 155 also stores an exclusive affinity indicator. As shown, this indicator also takes on two distinct values (i.e., "Y" or "N"), which indicates whether the virtual CPUs of the corresponding virtual machine are granted exclusive affinity to one or more physical CPUs of host computer 100. For example, assuming that VM 110₂ has one virtual CPU, then VM 110₂ (or, equivalently, the VCPU of VM 110₂) is given exclusive affinity to one physical CPU in host computer 100 In general, highly latency sensitive virtual machines (such as VM 110₂) have virtual CPUs that are granted exclusive affinity to one or more physical CPUs.

When a virtual CPU of a virtual machine has exclusive affinity to a physical CPU, the physical CPU is, effectively, dedicated to running that particular virtual CPU. That is, the kernel scheduler (which typically runs within kernel 136) will refrain from scheduling any processes for execution on the physical CPU to which the virtual CPU has exclusive affinity, even in cases where the physical CPU is in an idle state. Further, the kernel scheduler will refrain from scheduling most interrupt processing on the physical CPU. Instead, interrupt processing is directed away from the physical CPU and is directed to other physical CPUs, provided no virtual CPUs have exclusive affinity to such other physical CPUs.

Figure 3:
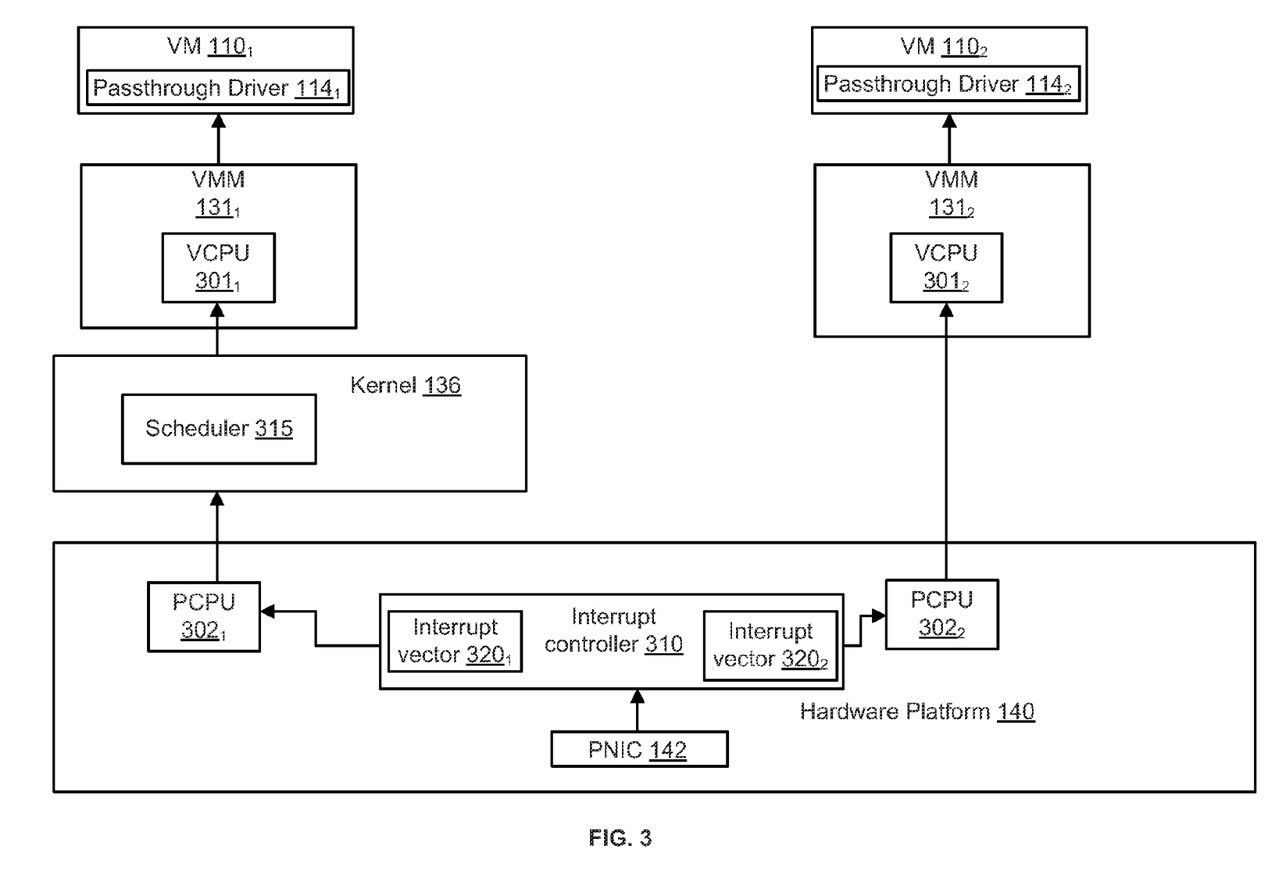
FIG. 3 is a diagram that illustrates the processing of interrupts from a passthrough NIC, according to embodiments.

FIG. 3 is a diagram that illustrates the processing of interrupts from a passthrough NIC, according to embodiments. FIG. 3 depicts VM 110₁ and VM 110₂. Each VM includes a passthrough driver, 114₁ and 114₂, respectively. Each of the passthrough drivers transmit packets to and receive packets from PNIC 142, which is shared among virtual machines executing on host computer 100. In one or more embodiments, PNIC 142 is a Single Root I/O Virtualization (or SR-IOV) NIC. Further, each of VMs 110₁ and 110₂ has a corresponding VMM (i.e., VMM 131₁ and VMM 131₂). As previously mentioned, each VMM 131 implements a virtual hardware platform for the corresponding virtual machine.

Among the virtual hardware components that are implemented by the VMMs are virtual CPUs (VCPUs). Thus, as shown in FIG. 3, VMM 131₁ implements VCPU 301₁, while VMM 131₂ implements VCPU 301₂. Each VCPU appears as a physical CPU to the guest operating system in the corresponding virtual machine. However, from the standpoint of the hypervisor and kernel, each VCPU appears as a process to be scheduled and dispatched for execution on a physical CPU.

Each of VMs 110₁ and 110₂ has a latency sensitivity status. That is, each VM may be non-latency sensitive, highly latency sensitive, or moderately latency sensitive. Based on the entries in latency sensitivity data 143 (which are based on the entries in latency sensitivity table 155), VM 110₁ is not highly latency sensitive, while VM 110₂ is highly latency sensitive. This is the case because, as shown in FIG. 2, VM ID 210₁ (which corresponds to VM 110₁) is stored in latency sensitivity table 155 with a latency sensitivity indicator that is set to "N." As previously mentioned, a virtual machine is highly latency sensitive when its corresponding latency sensitivity indicator is set to Y. Further, because the exclusive affinity indicator for VM ID 210₁ is set to N, none of the VCPUs of VM 110₁ has exclusive affinity to any physical CPUs of host computer 100.

By contrast, VM 110₂ is highly latency sensitive. As shown in FIG. 3, VM ID 210₂ (which corresponds to VM 110₂) is stored in latency sensitivity table 155 with a latency sensitivity indicator set to "Y." Further, because the exclusive affinity indicator for VM ID 210₂ is set to Y, each of the VCPUs of VM 110₂ has exclusive affinity to one of the physical CPUs of host computer 100.

Because VM 110₂ is highly latency sensitive and has an exclusive affinity indicator set to Y, the virtual CPU of VM 110₂ (i.e., VCPU 301₂) is granted exclusive affinity to one of the physical CPUs (i.e., PCPUs) of host computer 100. As shown in FIG. 3, host computer 100 includes hardware platform 140, which, in turn, includes at least two PCPUs, PCPU 302₁ and PCPU 302₂. In the embodiment depicted in FIG. 3, VCPU 301₂ is given exclusive affinity to PCPU 302₂. Thus, PCPU 302₂ is effectively dedicated to executing tasks for VM 110₂ and no other virtual machine.

By contrast, because VM 110₁ is not highly latency sensitive and has an exclusive affinity indicator set to N, VM 110₁ does not have any of its tasks executed on PCPU 302₂. Further, VM 110₁ shares processing time on the rest of the PCPUs of host computer 100 with all other programs (including virtual machines) that execute therein. Thus, as shown in FIG. 3, VCPU 301₁ (which is the VCPU for VM 110₁) is executed, for example on PCPU 302₁. It should be noted that, although FIG. 3 depicts only two PCPUs for host computer 100, host computer 100 may also include more than two PCPUs. However, in any case, PCPU 302₂ remains dedicated to executing tasks for VM 110₂ (i.e., VCPU 301₂), while PCPU 301₁ (and all other PCPUs) are shared among VCPU 301₁ and any other virtual machines and user applications executing on host computer 100.

As previously mentioned, when PNIC 142 transmits packets over the network or when PNIC 142 receives packets that are destined for host computer 100, PNIC 142 generates an interrupt. According to embodiments, the generated interrupt is processed by an interrupt controller (such as an advanced programmable interrupt controller, or APIC), which determines a physical CPU to which the generated interrupt is to be posted. In the embodiment shown in FIG. 3, the component that directs interrupts from PNIC 142 to a particular CPU is depicted as interrupt controller 310. Interrupt controller is shown, conceptually, to reside in hardware platform 140. However, alternative embodiments include an interrupt controller as resident within a hypervisor, such as hypervisor 130.

Interrupt controller 310 determines a particular PCPU to which an interrupt should be forwarded based on an interrupt vector 320 that corresponds to the port of the PNIC on which the interrupt is received. That is, an interrupt vector 320 contains entries that correspond to interrupt handlers for interrupts generated over ports that are accessible in PNIC 142. Since PNIC 142 (being a shared passthrough NIC) supports multiple connections by virtual machines executing within host computer 100, each virtual machine connection may be viewed as pertaining to a particular port. Each port has a corresponding interrupt vector 320. As shown in FIG. 3, interrupt controller 310 includes interrupt vector 320₁ and interrupt vector 320₂. Thus, when PNIC 142 generates an interrupt on a particular port, interrupt controller 310 posts the interrupt to a physical CPU in accordance with the interrupt vector 320 that corresponds to the port. Further, as disclosed herein, the kernel (such as kernel 136) modifies the interrupt vectors to post interrupts to a PCPU depending on which virtual machines are determined to be latency sensitive and which have exclusive affinity to that PCPU.

In addition, according to one or more embodiments, when an interrupt is forwarded to a PCPU, software that is currently executing on the PCPU is interrupted and the interrupt is appropriately handled. For instance, if a virtual machine is currently executing on the PCPU to which the interrupt is posted, the virtual machine code (typically, the virtual machine monitor) recognizes that an interrupt occurred on the PCPU. The virtual machine then forwards the interrupt to the kernel, which then posts the interrupt (via a software interrupt) to the virtual machine to which the interrupt corresponds. It should be noted that the interrupt may correspond to the virtual machine that was initially interrupted and, hence, in this case, the kernel posts the interrupt back to that virtual machine. Moreover, in the case where the interrupted physical CPU is executing kernel code (rather than virtual machine code), the kernel handles the interrupt by posting a software interrupt to the virtual machine to which the interrupt corresponds.

In general, when a virtual machine receives packets over a PNIC, the PNIC generates a physical interrupt that is received by an interrupt controller (such as interrupt controller 310 in FIG. 3). The interrupt controller then posts the interrupt to a PCPU in accordance with an interrupt vector associated with the port of the PNIC over which the packets were received. The interrupted PCPU handles the interrupt and forwards the interrupt to the correct VMM (e.g., the VMM corresponding to either VM $110_1$ or VM $110_2$, shown in FIG. 3). Since the forwarding of the interrupt usually takes place within the kernel, latency may occur because, in order to forward the interrupt, additional code in the kernel must be invoked. This results in the launching of tasks that are scheduled and dispatched. Execution of the tasks results in the interrupts being reflected to one or more VCPUs within the corresponding VMM as a physical interrupt.

Referring to the embodiment depicted in FIG. 3, in order to address the aforementioned latency, kernel 136 is configured to determine whether a virtual machine is latency sensitive and has exclusive affinity to a PCPU, and, if it so determines, to configure (i.e., program) interrupt controller 310 to reflect interrupts generated by PNIC 142 that correspond to the latency sensitive virtual machine to the PCPU for which the latency sensitive virtual machine has exclusive affinity. Thus, if the generated interrupt corresponds to a latency sensitive virtual machine with exclusive affinity, then interrupt controller 310 is programmed to post the interrupt for the PNIC directly to the PCPU to which the latency sensitive virtual machine has exclusive affinity. Otherwise, if the generated interrupt corresponds to a virtual machine that is not latency sensitive, then interrupt controller 310 forwards the interrupt for the PNIC by posting the interrupt to a PCPU that no virtual machine has exclusive affinity to. Then, according to one or more embodiments, the PCPU forwards the interrupt to a scheduler 315 in the kernel (i.e., kernel 136), which then forwards the interrupt to the target VMM.

For example, as shown in FIG. 3, interrupt controller 310 is notified of interrupts from PNIC 142. When interrupt controller 310 receives an interrupt that corresponds to the transmitting or receiving of packets for VM $110_1$ (which, as previously mentioned, is not latency sensitive), then interrupt controller 310 posts an interrupt to a PCPU that virtual machines do not have exclusive affinity to. Specifically, kernel 136 has previously determined that VM $110_1$ is not latency sensitive and does not have exclusive affinity. Thus, interrupt controller 310 is programmed (via modification by kernel 136 of interrupt vector $320_1$) to refrain from posting interrupts to any PCPU that another virtual machine has exclusive affinity to. After posting the interrupt to a PCPU, if a virtual machine is executing on the PCPU (either VM $110_1$ or some other VM that does not have exclusive affinity), the interrupt is forwarded to kernel 136, which then forwards the interrupt to VM $110_1$. If kernel 136 is executing on the PCPU, then the interrupt is forwarded by kernel 136 directly to VM $110_1$. To forward the interrupt to VM $110_1$, kernel 136 launches one or more tasks to forward the interrupt to VMM $131_1$ (or, more specifically, to VCPU $301_1$). These tasks are scheduled and dispatched by a kernel scheduler (such as scheduler 315). Thus, in the embodiment depicted in FIG. 3, interrupts from PNIC 142 are posted to PCPU $302_1$ and are forwarded to VCPU $301_1$ via kernel 136. As mentioned previously, PCPU $302_1$ is shared by VM $110_1$ with other VMs (not shown) that are not latency sensitive.

By contrast, when data packets are transmitted or received for VM $110_2$ (which is highly latency sensitive and has exclusive affinity), interrupt controller 310 receives the interrupt and posts the interrupt to PCPU $302_2$ (along with handler information obtained from interrupt vector 320). As previously mentioned, because VM $110_2$ is highly latency sensitive and has exclusive affinity, kernel 136 programs interrupt controller 310 to post interrupts for VM $110_2$ to the PCPU (i.e., PCPU $302_2$) that VM $110_2$ has exclusive affinity to. Indeed, in embodiments, interrupt vector $320_2$ (which corresponds to the port for VM $110_2$) is programmed by kernel 136 to inform interrupt controller 310 to post interrupts received on that port to PCPU $302_2$. Interrupt vector $320_2$ is updated by kernel 136 to specify PCPU $302_2$ as the target PCPU for posting interrupts at a time that the corresponding VM (i.e., VM $110_2$) is configured to have exclusive affinity to that PCPU. In this way, the interrupt vector $320_2$ is considered as having affinity to PCPU. Thus, because VM $110_2$ is highly latency sensitive and has exclusive affinity to PCPU $302_2$, the posting of the interrupt from PNIC 142 to PCPU $302_2$ has the effect of immediately posting the interrupt to VMM $131_2$ (and, consequently, VCPU $301_2$) without going through kernel 136. Therefore, the added latency that results from executing extra kernel code is avoided for data packets received for VM $110_2$ on PNIC 142.

Figure 4:
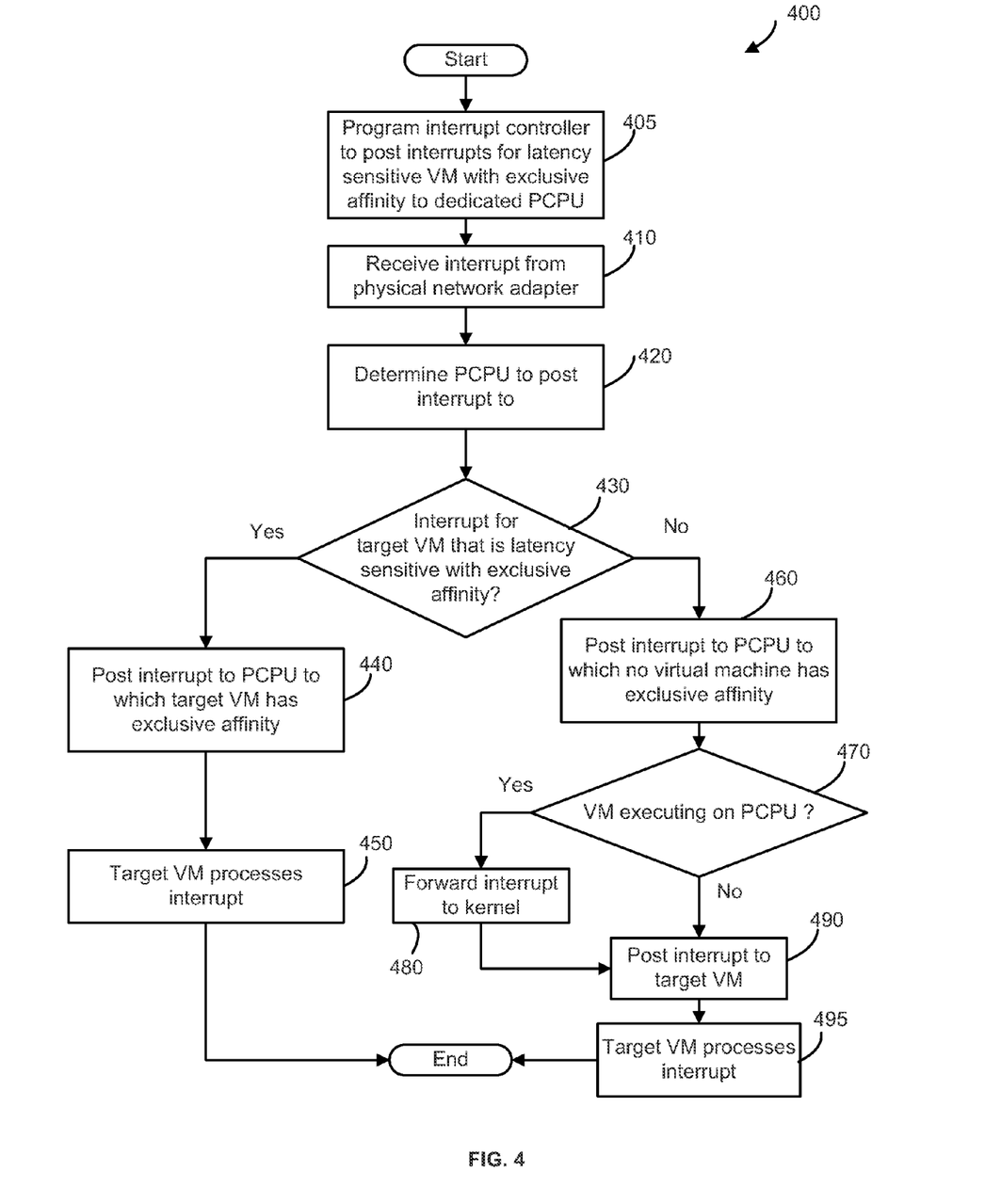
FIG. 4 is a flow diagram that illustrates a method for passing interrupts generated by a passthrough NIC to a latency sensitive virtual machine, according to embodiments.

FIG. 4 is a flow diagram that illustrates a method 400 for passing interrupts generated by a passthrough NIC to a latency sensitive virtual machine with exclusive affinity, according to one or more embodiments. Method 400 is performed, in embodiments, by interrupt controller 310 and kernel 136, depicted in FIG. 3. Method 400 begins at step 405, where the interrupt controller (such as interrupt controller 310) is programmed to post interrupts for a latency sensitive VM having exclusive affinity to a PCPU to which the VM has exclusive affinity. As previously mentioned, this step is performed by the kernel when the kernel detects the configuration (or the powering on) of a VM that is defined as latency sensitive and which has exclusive affinity to a particular PCPU. According to embodiments, the kernel updates an interrupt vector corresponding to a port of the passthrough NIC which, itself, corresponds to the latency sensitive virtual machine.

Next, after the interrupt controller has been programmed, method 400 proceeds to step 410. At step 410, the interrupt controller receives an interrupt from a physical network adapter (such as PNIC 142 depicted in FIG. 1). It should be noted that the physical network adapter is a passthrough NIC that communicates data packets directly to one or more virtual machines.

After the interrupt controller receives the interrupt at step 410, method 400 proceeds to step 420. At step 420, the interrupt controller determines a target PCPU to post the interrupt to. The determination is made based on the interrupt vector corresponding to the port over which the interrupt was generated. For example, if data packets arrive at PNIC 142 that are to be delivered to VM $110_1$ (depicted in FIG. 3), those packets arrive on a port of PNIC 142 that corresponds to interrupt vector $320_1$. As shown in FIG. 3, interrupt controller 310 selects a PCPU (i.e. PCPU $302_1$) that corresponds to interrupt vector $320_1$ to post such interrupts to.

Once the interrupt controller determines the target PCPU to post the received interrupt to, method 400 proceeds to step 430. Step 430, is a logical decision point that hinges on whether the received interrupt is for a target virtual machine that is latency sensitive and has exclusive affinity to any of the PCPUs of host computer 100. As previously mentioned, kernel 136 programs the interrupt controller (via the corresponding interrupt vector) to post received interrupts for virtual machines that are latency sensitive and that have exclusive affinity to a particular PCPU. For example, if data packets are received at PNIC 142 for delivery to VM $110_1$, then interrupt controller 310 is programmed by kernel 136 to post the interrupt to a PCPU to which no virtual machine has exclusive affinity. However, if data packets are received at PNIC 142 for delivery to VM $110_2$, then interrupt controller 310 is programmed (by kernel 136) to post the interrupt to a PCPU to which VM $110_2$ has exclusive affinity.

If the received interrupt corresponds to a virtual machine that is latency sensitive and has exclusive affinity, then method 400 proceeds to step 440. At step 440, the interrupt controller posts the received interrupt to a physical CPU that a virtual CPU of the target virtual machine has exclusive affinity to. As previously mentioned, one or more virtual CPUs of a virtual machine that is highly latency sensitive are granted exclusive affinity to one or more physical CPUs. In such cases, the physical CPUs are effectively dedicated to the virtual CPUs of the corresponding highly latency sensitive virtual machine.

For example, referring to FIG. 3, VM $110_2$ (which is highly latency sensitive) corresponds to VMM $131_2$, which includes VCPU $301_2$. VCPU $301_2$ has exclusive affinity to PCPU $302_2$. Interrupt controller 310 (having been programmed by the kernel to do so) posts the received interrupt to PCPU $302_2$, which VCPU $301_2$ has exclusive affinity to. Interrupt controller 310 performs this step in accordance with information contained in interrupt vector $320_2$.

The posting of the received interrupt to the PCPU to which the virtual machine has exclusive affinity ensures that the generated interrupt is reflected directly to the VCPU. For example, if the interrupt is posted to PCPU $302_2$, the interrupt is reflected to VCPU $301_2$ without any added delay that occurs when routing the interrupt through the kernel.

After the interrupt is posted to the physical CPU at step 440, method 400 then proceeds to step 450, where the target VM processes the interrupt. After step 450, method 400 terminates.

However, referring back to step 430 of method 400, if the received interrupt does not correspond to a target virtual machine that is latency sensitive and which has exclusive affinity, then method 400 proceeds, instead, to step 460. At step 460, the interrupt controller posts the received interrupt to a physical CPU to which no virtual machine has exclusive affinity. This scenario is depicted conceptually in FIG. 3, where interrupt controller 310 is depicted as posting interrupts that are destined for VM $110_1$ (which is not latency sensitive) to PCPU $302_1$. It should be noted that, for such a received interrupt, since the interrupt does not correspond to a virtual machine that has exclusive affinity, the kernel does has programmed the interrupt controller to post the interrupt to a PCPU to which no virtual machine has exclusive affinity.

After step 460, it is determined, at step 470, whether a VM is already executing on the PCPU to which the interrupt has been posted. If a VM is executing on the interrupted PCPU, then, at step 480, the VM forwards the interrupt to the kernel. Method 400 then proceeds to step 490.

However, if a VM is not executing on the interrupted PCPU, then method 400 proceeds directly to step 490. It is assumed that when a VM is not executing on the interrupted PCPU, then kernel code is executing. However, it should be noted that application code not corresponding to a VM may also be executing on the PCPU at the time the interrupt is posted.

At step 490, the kernel launches one or more tasks to post the received interrupt to the target virtual machine, such as VM $110_1$ in FIG. 3. Thus, the forwarding of the interrupt to a non-latency sensitive virtual machine which does not have exclusive affinity incurs processing delay that is not present for a latency sensitive virtual machine.

After step 490, the target VM (having received the interrupt from the kernel) processes the interrupt. After the target VM processes the interrupt, method 400 terminates.

Certain embodiments as described above involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operation system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer (e.g., a container engine) is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) —CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a host computer having a plurality of virtual machines executing therein under the control of a hypervisor, the host including a physical network interface controller (NIC), a method of processing interrupts from the physical NIC, the method being performed by the host computer and comprising:
   detecting an interrupt generated by the physical NIC upon reception of a packet by the physical NIC;
   determining a virtual machine to which the interrupt corresponds;
   determining, by the hypervisor, whether the virtual machine has exclusive affinity to a physical central processing unit (CPU);
   if the virtual machine has exclusive affinity to a physical CPU, then forwarding the interrupt to the virtual machine; and
   if the virtual machine does not have exclusive affinity to a physical CPU, then invoking a process in the hypervisor to forward the interrupt to the virtual machine.

2. The method of claim 1, wherein the physical NIC is configured to operate in a passthrough mode that enables transmission of packets between the physical NIC and a virtual machine, wherein the packets are not forwarded between the physical NIC and the virtual machine by the hypervisor.

3. The method of claim 2, wherein the physical NIC includes a plurality of ports, each port configured to receive packets corresponding to one of the virtual machines.

4. The method of claim 1, further comprising:
   after determining, by the hypervisor, whether the virtual machine has exclusive affinity to a physical CPU, wherein the determining comprises:
   reading an exclusive affinity indicator for the virtual machine; and
   determining whether the exclusive affinity indicator is a predetermined value,
   programming an interrupt controller based on the determining.

5. The method of claim 4, wherein, if the virtual machine has exclusive affinity, then the forwarding of the interrupt comprises:
   determining, by the interrupt controller, a first physical CPU, wherein a virtual CPU of the virtual machine has exclusive affinity to the first physical CPU; and
   posting, by the interrupt controller, the interrupt to the first physical CPU.

6. The method of claim 4, further comprising, if the virtual machine does not have exclusive affinity, then posting the interrupt, by the interrupt controller, to a second physical CPU that is different from the first physical CPU.

7. The method of claim 6, wherein no virtual CPU has exclusive affinity to the second physical CPU.

8. A non-transitory computer-readable medium comprising instructions executable by a host computer, the host computer having a plurality of virtual machines executing therein under the control of a hypervisor, and the host including a physical network interface controller (NIC), where the instructions, when executed, cause the host computer to perform a method of processing interrupts from the physical NIC, the method comprising:
   detecting an interrupt generated by the physical NIC upon reception of a packet by the physical NIC;
   determining a virtual machine to which the interrupt corresponds;
   determining, by the hypervisor, whether the virtual machine has exclusive affinity to a physical central processing unit (CPU);
   if the virtual machine has exclusive affinity to a physical CPU, then forwarding the interrupt to the virtual machine; and if the virtual machine does not have exclusive affinity to a physical CPU, then invoking a process in the hypervisor to forward the interrupt to the virtual machine.

9. The computer-readable medium of claim 8, wherein the physical NIC is configured to operate in a passthrough mode that enables transmission of packets between the physical NIC and a virtual machine, wherein the packets are not forwarded between the physical NIC and the virtual machine by the hypervisor.

10. The computer-readable medium of claim 9, wherein the physical NIC includes a plurality of ports, each port configured to receive packets corresponding to one of the virtual machines.

11. The computer-readable medium of claim 8, wherein the method further comprises:
    after determining, by the hypervisor, whether the virtual machine has exclusive affinity to a physical CPU, wherein the determining comprises:
        reading an exclusive affinity indicator for the virtual machine; and
        determining whether the exclusive affinity indicator is a predetermined value,
    programming an interrupt controller based on the determining.

12. The computer-readable medium of claim 11, wherein, if the virtual machine has exclusive affinity, then said forwarding of the interrupt comprises:
    determining, by the interrupt controller, a first physical CPU, wherein a virtual CPU of the virtual machine has exclusive affinity to the first physical CPU; and
    posting, by the interrupt controller, the interrupt to the first physical CPU.

13. The computer-readable medium of claim 11, further comprising, if the virtual machine does not have exclusive affinity, then posting the interrupt, by the interrupt controller, to a second physical CPU that is different from the first physical CPU.

14. The computer-readable medium of claim 13, wherein no virtual CPU has exclusive affinity to the second physical CPU.

15. A virtualized computing system, comprising:
    a host computer, the host computer having a plurality of virtual machines executing therein under the control of a hypervisor;
    a physical network interface controller (NIC); and
    an interrupt controller, wherein the hypervisor and interrupt controller are configured to perform a method of processing interrupts from the physical NIC, the method comprising:
        detecting an interrupt generated by the physical NIC upon reception of a packet by the physical NIC;
        determining a virtual machine to which the interrupt corresponds;
        determining, by the hypervisor, whether the virtual machine has exclusive affinity to a physical central processing unit (CPU);
        if the virtual machine has exclusive affinity to a physical CPU, then forwarding the interrupt to the virtual machine; and
        if the virtual machine does not have exclusive affinity, then invoking a process in the hypervisor to forward the interrupt to the virtual machine.

16. The system of claim 15, wherein the physical NIC is configured to operate in a passthrough mode that enables transmission of packets between the physical NIC and a virtual machine, wherein the packets are not forwarded between the physical NIC and the virtual machine by the hypervisor.

17. The system of claim 16, wherein the physical NIC includes a plurality of ports, each port configured to receive packets corresponding to one of the virtual machines.

18. The system of claim 15, wherein the method further comprises:
    after determining, by the hypervisor, whether the virtual machine has exclusive affinity to a physical CPU, wherein the determining comprises:
        reading an exclusive affinity indicator for the virtual machine; and
        determining whether the exclusive affinity indicator is a predetermined value,
    programming an interrupt controller based on the determining.

19. The system of claim 18, wherein, if the virtual machine has exclusive affinity, then said forwarding of the interrupt comprises:
    determining, by the interrupt controller, a first physical CPU to which a virtual CPU of the virtual machine has exclusive affinity; and
    posting, by the interrupt controller, the interrupt to the first physical CPU.

20. The system of claim 18, wherein the method further comprises, if the virtual machine does not have exclusive affinity, then posting, by the interrupt controller, the interrupt to a second physical CPU that is different from the first physical CPU.

\* \* \* \* \*